US005335094A

United States Patent [19]
Kaifu et al.

[11] Patent Number: 5,335,094
[45] Date of Patent: Aug. 2, 1994

[54] PHOTOELECTRIC CONVERTING DEVICE HAVING MATRIX WIRING AND READ-OUT OF PARALLEL SIGNALS AS A SERIAL SIGNAL

[75] Inventors: Noriyuki Kaifu, Yokohama; Toshihiro Saika, Zama; Tadao Endo, Atsugi; Tetsuya Shimada, Zama, all of Japan

[73] Assignee: Canon Kabushiki Kaisha, Tokyo, Japan

[21] Appl. No.: 26,107

[22] Filed: Mar. 1, 1993

Related U.S. Application Data

[63] Continuation of Ser. No. 649,728, Feb. 1, 1991, abandoned.

[30] Foreign Application Priority Data

Feb. 6, 1990 [JP] Japan .................................. 2-028044

[51] Int. Cl.⁵ ............................................ H04N 1/028
[52] U.S. Cl. ..................... 358/494; 358/482; 358/483
[58] Field of Search ............ 358/482, 483, 494, 213.11, 358/213.29, 213.31, 471, 474; 250/578; H04N 1/024, 1/028

[56] References Cited

U.S. PATENT DOCUMENTS

| 4,661,860 | 4/1987 | Miyazawa | 358/494 |
|---|---|---|---|
| 4,679,088 | 7/1987 | Chiyoma et al. | 358/483 |
| 4,788,445 | 11/1988 | Hatanaka et al. | 250/578 |
| 4,819,082 | 4/1989 | Ito et al. | 358/494 |
| 4,829,485 | 5/1989 | Hatanaka et al. | 365/239 |
| 4,931,873 | 6/1990 | Nishiura | 358/213.11 |
| 5,041,913 | 8/1991 | Abe | 358/213.11 |
| 5,283,669 | 1/1994 | Sakai et al. | 358/483 |

FOREIGN PATENT DOCUMENTS

| 233020 | 8/1989 | European Pat. Off. . |
|---|---|---|
| 55-132254 | 10/1980 | Japan . |
| 57-207487 | 3/1983 | Japan . |
| 59-012666 | 5/1984 | Japan . |
| 62-155666 | 7/1987 | Japan . |
| 63-214084 | 1/1989 | Japan . |

Primary Examiner—Edward L. Coles, Sr.
Assistant Examiner—Kim Yen Vu
Attorney, Agent, or Firm—Fitzpatrick, Cella, Harper & Scinto

[57] ABSTRACT

To eliminate non-read time in a photoelectric converting device, a photoelectric converting section is provided in which a plurality of photoelectric conversion elements, switching elements, matrix signal wirings, and gate drive wirings are arranged on the same substrate such that the photoelectric converting section generates parallel signals. A drive switching section is provided for applying drive signals to the gate drive wirings. A read switching section is provided for converting the parallel signals which are transferred from the matrix signal wirings into a serial signal, and for outputting the serial signal. The read switching section comprises a plurality of transfer switches respectively connected to the matrix signal wirings. The transfer switches are preferably activated together, simultaneously. A plurality of read capacitors are also provided in the read switching section to store the charges transferred through the matrix signal wirings. The read switching section also includes a plurality of read switches for reading out carriers stored in the plurality of read capacitors. The read switching section also includes reading circuitry for reading the read switches by sequentially switching the read switches so that a period of driving the transfer switches and a period of driving a first one of the read switches are partially overlapped.

17 Claims, 9 Drawing Sheets

PHOTOELECTRIC CONVERTING DEVICE HAVING MATRIX WIRING AND READ-OUT OF PARALLEL SIGNALS AS A SERIAL SIGNAL

This application is a continuation of application Ser. No. 07/649,728, filed Feb. 1, 1991, now abandoned.

BACKGROUND OF THE INVENTION

1. Field of the Invention

The present invention relates to a photoelectric converting device and, more particularly, to a photoelectric converting device for use in an input section of an image processing apparatus, such as a facsimile apparatus, an image reader, a copier, an electronic blackboard, or the like.

2. Related Background Art

In recent years, a long line sensor having an equal magnification optical system has been developed as a photoelectric converting device in order to realize a miniaturization and a high performance of the facsimile apparatus, image reader, and the like.

Hitherto, such a kind of line sensor is constructed by connecting an integrated circuit (hereinafter, abbreviated to IC) for signal processing in which switching elements and the like are respectively constructed for photoelectric conversion elements arranged like an array of one line. However, as the number of photoelectric conversion elements, 1728 elements are needed in the case of the A4 size according to the G3 standard of the facsimile apparatus. Therefore, the number of installing steps also increases and a line sensor which sufficiently satisfies requirements regarding the manufacturing costs and the reliability is not obtained yet.

On the other hand, hitherto, a construction by matrix wirings has been used as a construction to reduce the number of signal processing ICs and to reduce the number of installing steps.

There has also been tried to cheaply provide an image reading apparatus of the long contact type in which thin film transistors (hereinafter, abbreviated to TFT) are used as switching elements and an integrated structure comprising photoelectric conversion elements, thin film transistors, matrix wirings, and the like is used, thereby reducing the function of a signal processing IC and realizing a high reading speed.

Further, to provide an image reading apparatus of the long contact type of low manufacturing costs and a high reliability, there has also been developed a method whereby the photoconductive converting layer of the photoelectric conversion element and the semiconductor layer of the TFT are formed by the same material such as amorphous silicon and the photoelectric conversion elements, TFT, matrix wirings, and the like are integratedly formed on the same substrate by using the same manufacturing steps.

Further, to realize miniaturization and low costs, there has also been proposed a photoelectric converting device in which the photoelectric conversion element directly detects the reflected light from an original through a transparent spacer such as a glass or the like without using an equal magnification fiber lens array.

FIG. 1 shows an equivalent circuit diagram of a conventional photoelectric converting device which has already been proposed.

Light information which enters photoelectric conversion elements $S_{1-1}$ to $S_{36-48}$ is transmitted from the photoelectric conversion elements $S_{1-1}$ to $S_{36-48}$ through accumulation capacitors $C_{s1-1}$ to $C_{s36-48}$, transfer TFTs $T_{1-1}$ to $T_{36-48}$, resetting TFTs $R_{1-1}$ to $R_{36-48}$, and matrix signal wirings $L_1$ to $L_{48}$ and become parallel voltage outputs. Further, the parallel voltage outputs are supplied to a read switch IC and become a serial signal. The serial signal is taken out to the outside.

In an example of a construction of the above conventional photoelectric converting device, the photoelectric conversion elements of 1728 bits corresponding to the total number of pixels are divided into 36 blocks every 48 bits. The operations of the 36 blocks are sequentially executed on a block unit basis. FIG. 2 shows a timing chart when an original of a uniform image concentration is read by the conventional photoelectric converting device.

The light information which enters the photoelectric conversion elements $S_{1-1}$ to $S_{1-48}$ of the first block is converted into photo currents and are accumulated as charges into the accumulation capacitors $C_{s1-1}$ to $C_{s1-48}$. After the elapse of a predetermined time, a first voltage pulse to transfer is applied to a gate drive line $G_1$ for a time $t_1$, thereby switching the transfer TFTs $T_{1-1}$ to $T_{1-48}$ to the on state. The charges in the accumulation capacitors $C_{s1-1}$ to $C_{s1-48}$ are transmitted through the matrix signal wirings $L_1$ to $L_{48}$ and are transferred to load capacitors $C_{L1}$ to $C_{L48}$, so that potentials $V_{L1}$ to $V_{L48}$ of the load capacitors rise (transfer operation).

Subsequently, a voltage pulse is sequentially supplied from a shift register $SR_2$ to gate drive lines $g_1$ to $g_{48}$ and read switches $T_{sw1}$ to $T_{sw48}$ are sequentially switched to the on state, thereby converting the signals of the first block which were transferred to the load capacitors $C_{L1}$ to $C_{L48}$ into the serial signal. After completion of the impedance conversion, the serial signal is read out to the outside of the photoelectric converting apparatus.

After that, a voltage pulse $C_{res}$ to reset is supplied to reset switches $R_{sw1}$ to $R_{sw48}$ for a time $t_2$, thereby resetting the load capacitors $C_{L1}$ to $C_{L48}$.

Then, a voltage pulse is suppled to a gate drive line $G_2$ and the transfer operation of the second block is started. At the same time, the reset TFTs $R_{1-1}$ to $R_{1-48}$ are turned on, the charges in the accumulation capacitors $C_{s1-1}$ to $C_{s1-48}$ of the first block are reset, thereby preparing for the next readout operation.

In a manner similar to the above, by sequentially driving gate drive lines $G_3, G_4, \ldots$, the data of one line is generated.

In the conventional photoelectric converting device, the transfer operation, reading operation, and resetting operation are sequentially executed on a block unit basis as mentioned above. Therefore, the image signal from the photoelectric converting apparatus is intermittently generated as shown by $V_{out}$ in FIG. 2.

To use the conventional photoelectric converting device as an image input section of a system such as a facsimile apparatus or the like, there is a case where a problem such that a processing circuit to convert the intermittent signals which are generated from the photoelectric converting apparatus into the continuous signal is needed and a correction circuit to execute a shading correction and the like becomes complicated occurs.

For instance, processes for temporarily storing the signal output of the photoelectric converting device into a line memory before it is image processed and, thereafter, for converting the intermittent signals into the continuous signal are necessary. Or, it is necessary to non-continuously execute the image process.

Consequently, in the conventional photoelectric converting device, there is a case where problems such that the costs of the whole system rise and the like occur.

SUMMARY OF THE INVENTION

It is an object of the invention to provide a photoelectric converting device which can solve the foregoing problems. Practically speaking, it is an object of the invention to provide a photoelectric converting apparatus of low costs and a high image quality.

Still another object of the invention is to provide a photoelectric converting device which can fully or substantially eliminate a period of time when a signal between blocks is not generated in a signal output of the photoelectric converting apparatus which is driven in a matrix manner and which can substantially raise a reading speed.

Another object of the invention is to provide a photoelectric converting device having an advantage such that there is no need to perform processes for temporarily storing a signal output of the photoelectric converting apparatus into a line memory before it is image processed and for converting the intermittent signals into a continuous signal on the side of a system such as a facsimile apparatus or the like because a period of time when a signal between blocks is not generated in the signal output is eliminated or there is no need to non-continuously execute image processes, so that an increase in costs of the whole system and a deterioration in image quality are not caused.

A further another object of the invention is to provide a photoelectric converting device comprising: a photoelectric converting section in which a plurality of photoelectric conversion elements, switching elements, matrix signal wirings, and gate drive wires are arranged on a same substrate and which generates parallel signals; a drive switching section for applying drive signals to the gate drive wirings; and a read switching section for converting the parallel signals which are transferred from the matrix signal wirings into a serial signal and reading out to an outside, wherein the read switching section is constructed by transfer switches connected to the matrix signal wirings, read capacitors, and read switches for reading out parallel signals as a serial signal from the read capacitors by being sequentially switched.

According to the photoelectric converting device of the invention mentioned above, the intermittent output which causes a problem in the conventional photoelectric converting apparatus which is matrix driven every block is solved and the period of time when the signal between blocks is not generated is eliminated, so that a reading speed of the photoelectric converting apparatus can be made substantially higher. Further, by applying the photoelectric converting apparatus of the invention, since image processes on the side of a system such as a facsimile apparatus or the like can be executed by simple means, there is an advantage such that an increase in costs of the whole system and a reduction in image quality are not caused.

DETAILED DESCRIPTION OF THE PREFERRED EMBODIMENTS

Preferred embodiments of present invention will now be described in detail hereinbelow with reference to the drawings.

Figure 3:
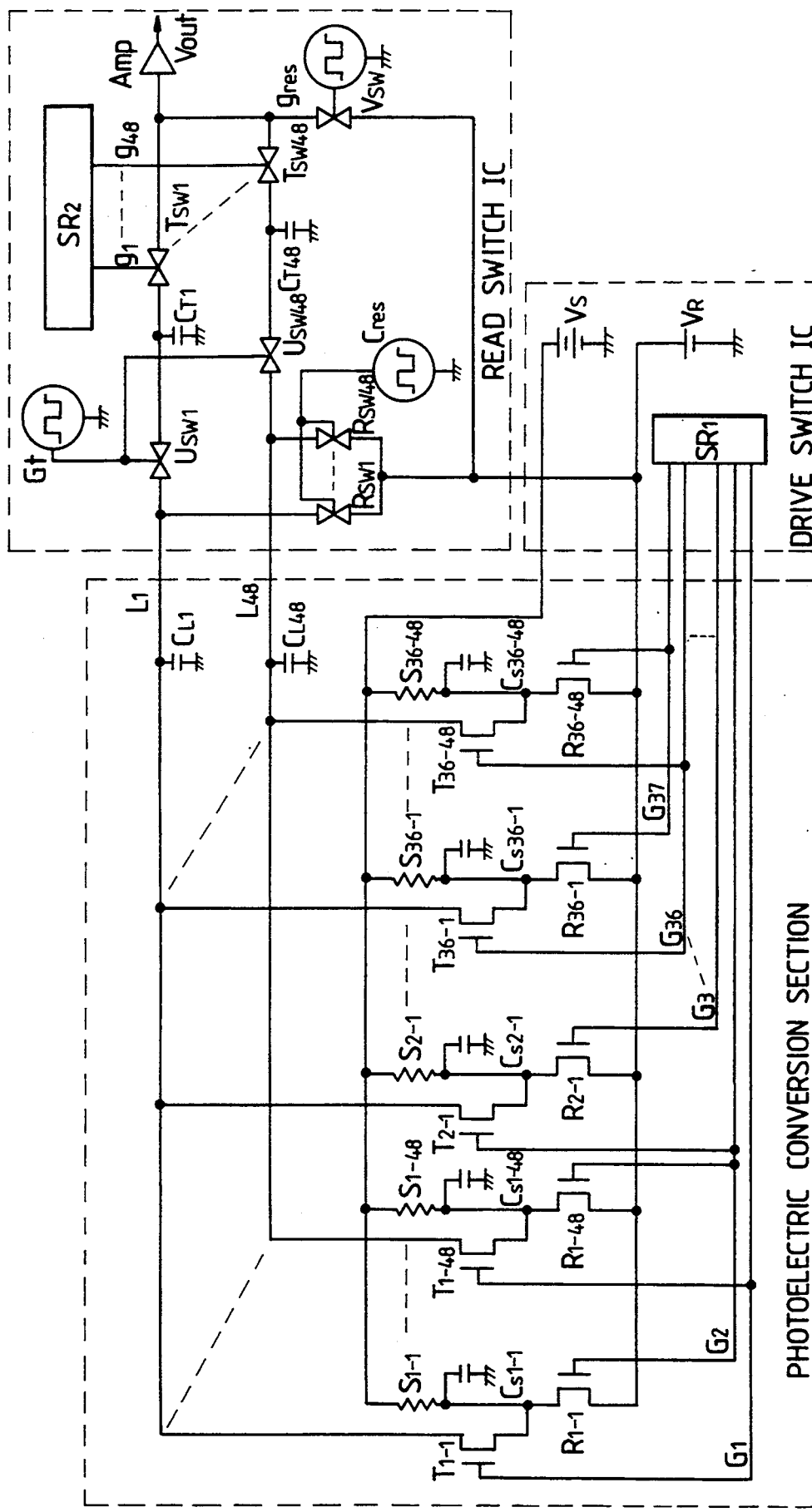
FIG. 3 is an equivalent circuit diagram of a photoelectric converting device according to the first embodiment of the invention.

FIG. 3 shows an equivalent circuit diagram of a photoelectric converting device as a preferred first embodiment according to the invention. In the embodiment, a construction of a photoelectric conversion section comprising a photoelectric conversion element section, an accumulation capacitor section, a TFT section, a matrix signal wiring section, a gate drive wiring section, and the like which are formed on the same substrate is fundamentally similar to the equivalent circuit diagram of the conventional photoelectric converting apparatus shown in FIG. 1.

The photoelectric converting device of the embodiment differs from the conventional photoelectric converting apparatus when it is seen as an equivalent circuit with respect to a read switch section in which transfer switches $U_{sw1}$ to $U_{sw48}$ and read capacitors $C_{T1}$ to $C_{T48}$ are provided between the load capacitors $C_{L1}$ to $CL_{48}$ and the read switches $T_{sw1}$ to $T_{sw48}$ in the matrix signal wiring section and a reset switch $V_{sw}$ to reset the read capacitors $C_{T1}$ to $C_{T48}$ is further provided.

Transfer switches $U_{sw1}$ to $U_{sw48}$ are connected to the matrix signal wirings $L_1$ to $L_{48}$, respectively, and are used to transfer the charges accumulated in the load capacitors $C_{L1}$ to $C_{L48}$ formed on the matrix signal wirings $L_1$ to $L_{48}$ to the read capacitors $C_{T1}$ to $C_{T48}$. The transfer switches $U_{sw1}$ to $U_{sw48}$ are simultaneously driven by a transfer pulse $G_t$.

The read switches $T_{sw1}$ to $T_{sw48}$ are connected to the read capacitors, respectively, and are used to sequentially read out potentials of the read capacitors $C_{T1}$ to $C_{T48}$ to the outside of the photoelectric converting apparatus through an amplifier Amp by sequentially switching the read switches. The read switches are sequentially driven by the shift register $SR_2$.

$R_{sw1}$ to $R_{sw48}$ denote the reset switches which are arranged between the load capacitors $C_{L1}$ to $C_{L48}$ and the transfer switches $U_{sw1}$ to $U_{sw48}$ which are formed in the matrix signal wiring section and are used to reset the potentials of the load capacitors $C_{L1}$ to $C_{L48}$ to a reset potential $V_R$. The reset switches are driven by the reset pulse $C_{res}$.

$V_{sw}$ denotes the reset switch to reset the potentials of the read capacitors $C_{T1}$ to $C_{T48}$ to the reset potential $V_R$. The reset switch $V_{sw}$ is driven by a reset pulse $g_{res}$.

Figure 4:
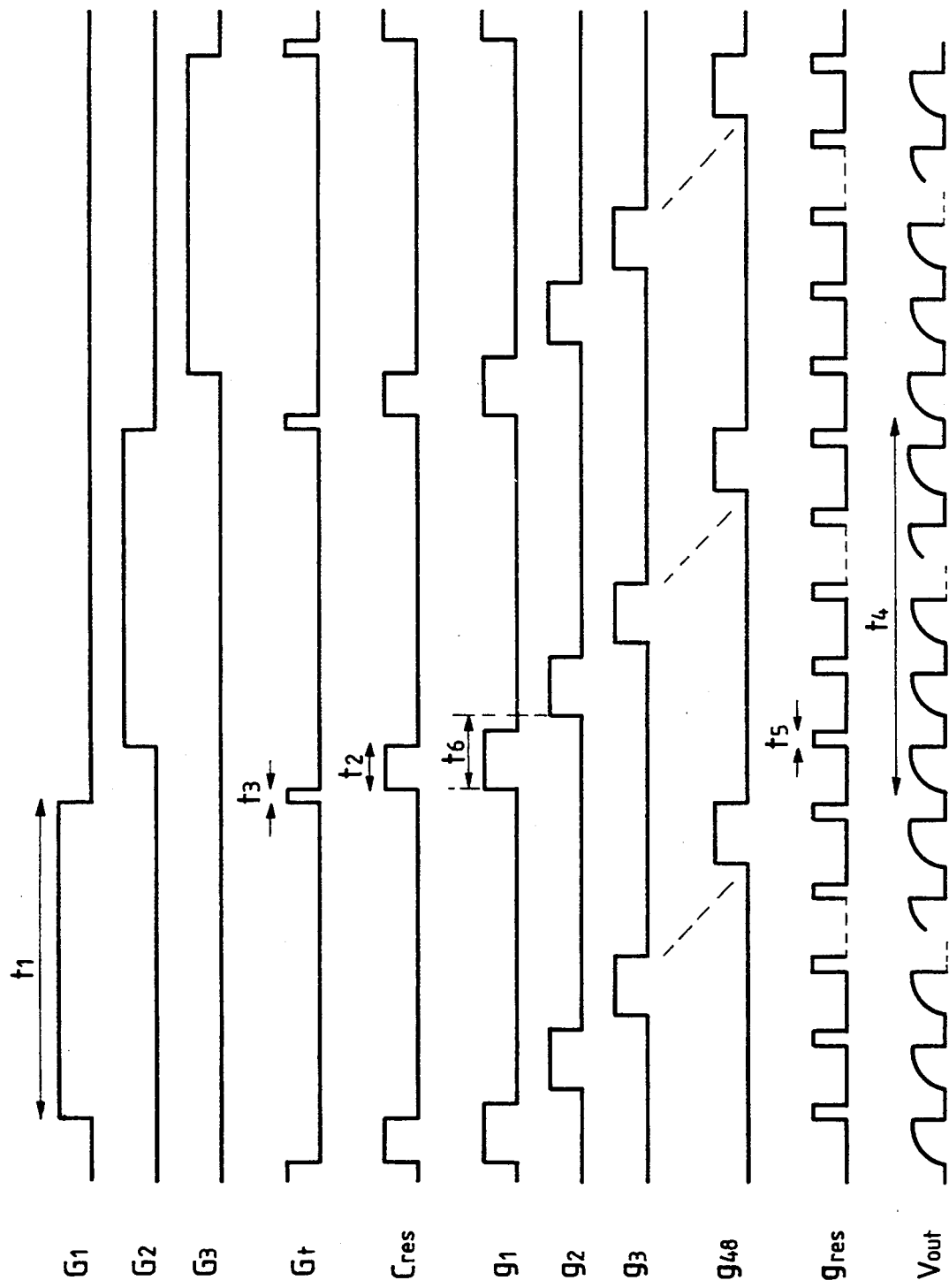
FIG. 4 is a timing chart for explaining the operation of the photoelectric converting device of FIG. 3.

FIG. 4 is a timing chart showing the reading operation of the photoelectric converting device of the first embodiment. It is now assumed that an original has a uniform image concentration.

The light information which enters the photoelectric conversion elements $S_{1\text{-}1}$ to $S_{1\text{-}48}$ of the first block is accumulated as charges into the accumulation capacitors $C_{s1\text{-}1}$ to $C_{s1\text{-}48}$. After the elapse of a predetermined time, a voltage pulse is applied to the first gate drive line $G_1$ from a shift register $SR_1$, so that the transfer TFTs $T_{1\text{-}1}$ to $T_{1\text{-}48}$ are turned on. Thus, the charges of the accumulation capacitors $C_{s1\text{-}1}$ to $C_{s1\text{-}48}$ are transmitted through the matrix signal wirings $L_1$ to $L_{48}$ and are transferred to the load capacitors $C_{L1}$ to $C_{L48}$. A gate pulse width $t_1$ which is necessary for such a transfer of the charges depends on a time constant which is determined by the smaller one of the capacitance values of the accumulation capacitor $C_s$ and the load capacitor $C_L$ and an ON resistance $R_t$ of the transfer TFT T.

The accumulation capacitor $C_s$ is properly set to a value within a range from 10 to 20 pF. The load capacitor $C_L$ is properly set to a value within a range from 100 to 300 pF. Since the ON resistance $R_t$ of the TFT using a-Si:H is so large to be a few MΩ, the time constant is set to a value within a range from 10 to 40 μs.

Subsequently, by applying a gate drive signal $G_t$, the transfer switches $U_{sw1}$ to $U_{sw48}$ are simultaneously turned on and the signal charges accumulated in the load capacitors $C_{L1}$ to $C_{L48}$ are simultaneously transferred to the read capacitors $C_{T1}$ to $C_{T48}$. A length $t_3$ of the gate pulse $G_t$ which is necessary for such a transfer of the charges depends on a time constant which is determined by an ON resistance $R_u$ of the transfer switch $U_{sw}$ and the smaller one of the capacitance values of the load capacitor $C_L$ and the read capacitor $C_T$.

The load capacitor $C_L$ is properly set to a value within a range from 100 to 300 pF. The read capacitor $C_T$ is properly set to a value within a range from 10 to 20 pF. Since the ON resistance $R_u$ can be selected to a value within a range from 50 to 300 Ω if a general analog switch is used, the time constant can be set to a short value of 100 ns or less.

Subsequently, by sequentially applying a voltage pulse to gate drive lines $g_1$ to $g_{48}$ from the shift register $SR_2$, the signal charges of the first block which were transferred to the read capacitors $C_{T1}$ to $C_{T48}$ are converted into the serial signal by the read switches $T_{sw1}$ to $T_{sw48}$. The serial signal is amplified by the amplifier Amp and is taken out as an output voltage $V_{out}$ to the outside of the photoelectric converting apparatus.

A period of time $t_4$ when the signal output of one block is generated depends on the ON resistance $R_t$ of the read switch $T_{sw}$, the input capacitance containing the wiring capacitance of the amplifier Amp, and the response speed of the amplifier. However, since the period $t_4$ can be selected to a value within a range from 1 to 2 μs per bit, it is set to a value within a range from about 50 to 100 μs per 48 bits.

In the reading operation, the reset pulse $g_{res}$ is successively applied to the reset switch $V_{sw}$ for a latter half period of time $t_5$ in the period of time when the voltage pulse which is applied to the gate drive lines $g_1$ to $g_{48}$ is set to the high voltage. Therefore, in the latter half period $t_5$, both of the read switch $T_{sw}$ and the reset switch $V_{sw}$ are simultaneously turned on and the read capacitors $C_{T1}$ to $C_{T48}$ are sequentially reset to the reset potential $V_R$.

A length $t_5$ of the gate pulse $g_{res}$ which is necessary to reset depends on a time constant which is determined by the ON resistance $R_v$ of the reset switch $V_{sw}$, the ON resistance $R_t$ of the read switch $T_{sw}$, and the capacitance value of the read capacitor $C_T$. However, the value of the read capacitor $C_T$ is properly set to a value within a range from 10 to 20 pF. Since the ON resistances $R_v$ and $R_t$ can be selected to values within a range from 50 to 300 Ω if general analog switches are used, the time constant can be set to a short value of 100 ns or less.

On the other hand, the load capacitors $C_{L1}$ to $C_{L48}$ are simultaneously reset by applying the reset pulse $C_{res}$ to the reset switches $R_{sw1}$ to $R_{sw48}$ in parallel with the above signal reading operation.

A length $t_2$ of the gate pulse $C_{res}$ which is needed to reset the load capacitors depends on a time constant which is determined by an ON resistance $R_r$ of the reset switch $R_{sw}$, the resistance of the matrix signal wirings, and the capacitance values of the load capacitor $C_L$. The length $t_2$ is set to a value of about a few μs.

After completion of the resetting operation, a voltage pulse is applied to the gate drive wiring $G_2$ from the shift register $SR_1$ and the transfer operation of the second block is started. Simultaneously with the transfer operation, the reset TFTs $R_{1\text{-}1}$ to $R_{1\text{-}48}$ of the first block are turned on. The charges of the accumulation capacitors $C_{s1\text{-}1}$ to $C_{s1\text{-}48}$ of the first block are reset to the reset potential $V_R$, thereby preparing for the next accumulating operation.

As will be obviously understood from the above description of the operations, according to the photoelectric converting apparatus of the invention, a period of time when the signal between blocks is not generated in the signal output $V_{out}$ can be eliminated and the reading speed can be substantially made fast.

That is, by transferring the signal charges in the load capacitors $C_{L1}$ to $C_{L48}$ to the read capacitors $C_{T1}$ to $C_{T48}$, the resetting operation of the load capacitors $C_{L1}$ to $C_{L48}$ and the transfer operation of the next block can be executed in parallel with the reading operation by the read switches $T_{sw1}$ to $T_{sw48}$.

Thus, a time which is required for the reading and resetting operations of one block is determined by either longer one of the sum $(t_1+t_2+t_3)$ of the period $t_1$ when the transfer TFTs are in the ON state, the period $t_3$ to transfer the charges to the read capacitors, and the period $t_2$ to reset the load capacitors and the period $t_4$ when the read switches $T_{sw1}$ to $T_{sw48}$ operate. Since the period $t_3$ is substantially so short to be 100 ns or less as mentioned above, such a time is decided by either longer period of the period $(t_1+t_2)$ and the period $t_4$.

In the conventional photoelectric converting apparatus, since the signal charges of the load capacitors $C_{L1}$ to $C_{L48}$ are not transferred to the read capacitors $C_{T1}$ to $C_{T48}$, the resetting operation of the load capacitors $C_{L1}$ to $C_{L48}$ and the transfer operation of the next block cannot be executed in parallel with the operations of the read switches $T_{sw1}$ to $T_{sw48}$. Therefore, a time which is required to execute the reading and resetting operations of one block is determined by the sum $(t_1+t_2+t_4)$ of the period $t_1$ when the transfer TFTs are in the ON state, the period $t_2$ to reset the load capacitors, and the period $t_4$ when the read switches $T_{sw1}$ to $T_{sw48}$ operate.

For instance, assuming that the periods $t_1$, $t_2$, and $t_4$ are respectively set to 40 μs, 5 μs, and 50 μs, the reading time per block is equal to 95 μs in the case of the conventional apparatus. According to the embodiment, the period $t_4$ is determined by a rate-determining step and is equal to 50 μs, so that the speed can be raised by about 50%.

In the embodiment, if the reading time per block is set to a value which is equal to that in the conventional apparatus, that is, if it is set to 95 μs in the above example, the period $t_4$ when the read switches $T_{sw1}$ to $T_{sw48}$ operate can be changed from 50 μs to 95 μs and the sum $(t_1+t_2)$ of the period $t_1$ when the transfer TFTs are in the ON state and the period $t_2$ to reset the load capacitors can be set to a long time of 95 μs. Therefore, the ON resistances of the switches (TFTs and general analog switches) which restrict the respective periods can be set to large values, namely, the sizes of switches can be reduced. If there is no need to raise the read speed as mentioned above, there are advantages such that the chip size can be reduced and the switching noises can be reduced.

Further, in the invention, since the period of time when the signal between blocks is not generated in the signal output $V_{out}$ is eliminated, there is no need to execute the processes for temporarily storing the signal output of the photoelectric converting apparatus into the line memory before it is image processed and for converting the intermittent signals into the continuous signal. Or, there is no need to non-continuously perform the image process. Thus, there are also advantages such that the costs of the whole system are not increased and the image quality doesn't deteriorate.

Figure 5A:
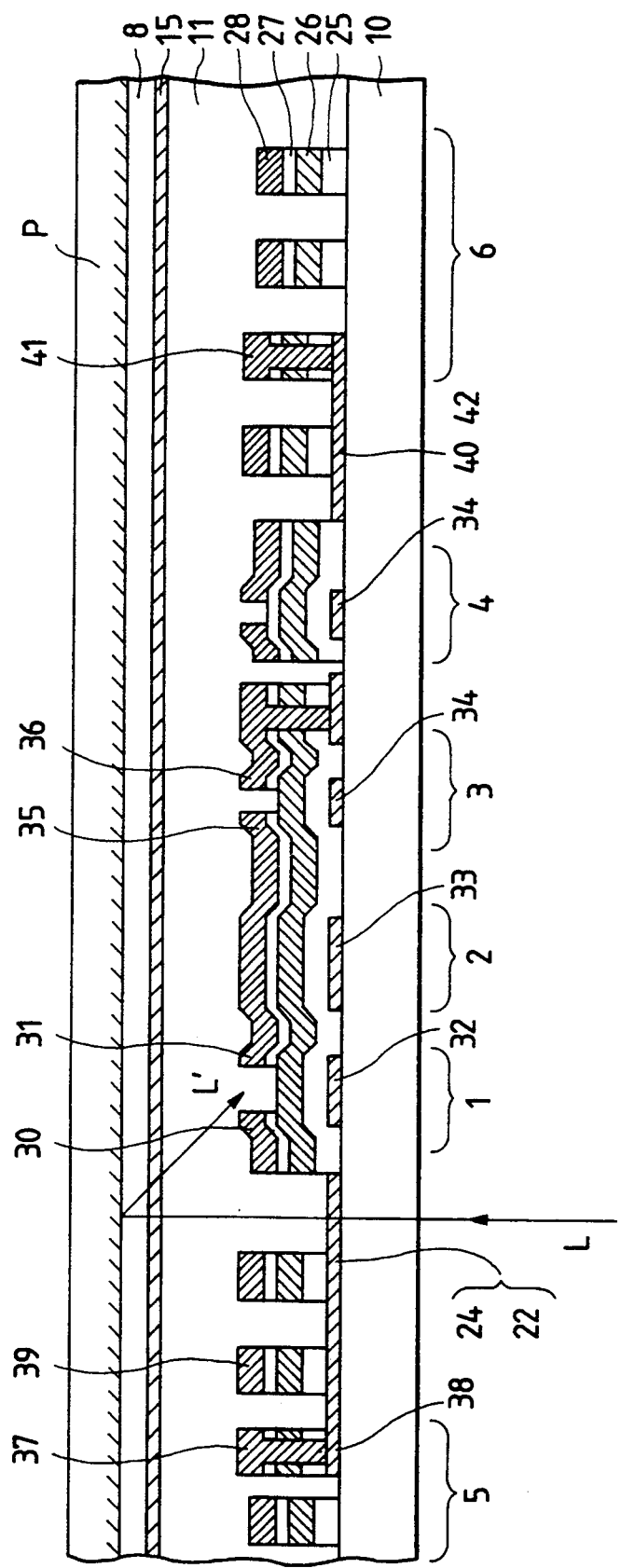
FIGS. 5A and 5B a schematic cross sectional view and a plan view of a photoelectric conversion section according to the photoelectric converting device of FIG. 3.
Figure 5B:
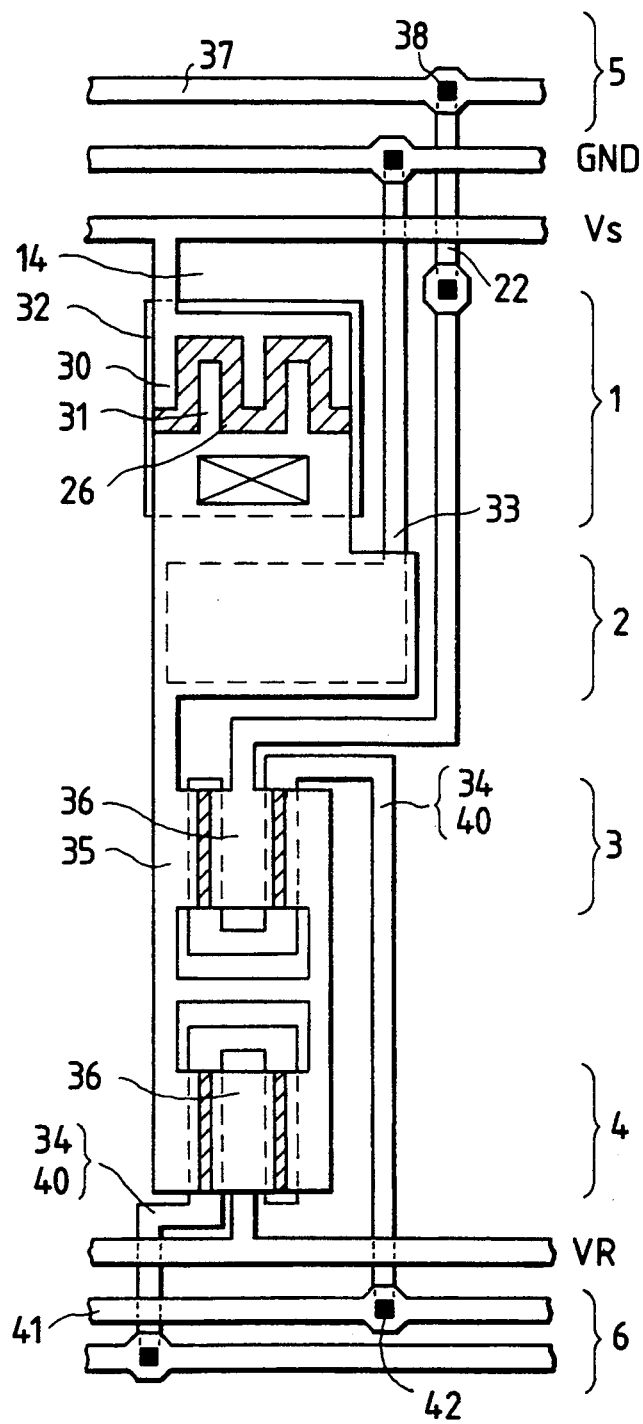

FIGS. 5A and 5B are a schematic cross sectional view and a schematic plan view of a photoelectric conversion section according to the photoelectric converting apparatus of the embodiment.

In the embodiment, a photoelectric conversion element section 1, an accumulation capacitor section 2, TFT sections 3 and 4, a matrix signal wiring section 5, a gate drive wiring section 6, and the like are integratedly formed on a translucent insulative substrate 10 by using a-Si:H by the same process.

A first conductor layer 24 made of Al, Cr, or the like, a first insulative layer 25 made of SiN or the like, a photoconductive semiconductor layer 26 made of a-Si:H, an ohmic contact layer 27 made of n+ type a-Si:H, and a second conductor layer 28 made of Al, Cr, or the like are formed on the insulative substrate 10.

In the photoelectric conversion element section 1, reference numerals 30 and 31 denote upper layer electrode wirings. A signal light L' which was reflected by an original P changes a conductivity of the photoconductive semiconductor layer 26 made of a-Si:H and changes a current flowing between the upper layer electrode wirings 30 and 31 which face like a comb. Reference numeral 32 denotes a light shielding layer made of a metal. The light shielding layer 32 can be also constructed in a manner such that it is connected to a proper driving source and serves as a control electrode (gate electrode) which faces the main electrodes 30 (source electrode or drain electrode) and 31 (drain electrode or source electrode).

The accumulation capacitor section 2 comprises: a lower layer electrode wiring 33; the first insulative layer 25 and the photoconductive semiconductor layer 26 which are formed on the lower layer electrode wiring 33; and a wiring which is formed on the photoconductive semiconductor layer 26 and is continuous with the upper layer electrode wiring 31 of the photoelectric conversion section 1. The accumulation capacitor section 2 has a structure of what is called an MIS capacitor. Any one of a positive bias and a negative bias can be used as a bias condition. However, by setting the bias condition so that the lower layer electrode wiring 33 is always set to a negative bias, a stable capacitance and stable frequency characteristics can be obtained.

The TFT sections 3 and 4 comprise: a lower layer electrode wiring 34 serving as a gate electrode; the second insulative layer 25 serving as a gate insulative layer; the semiconductor layer 26; an upper layer electrode wiring 35 serving as a source electrode; an upper layer electrode wiring 36 serving as a drain electrode; and the like.

In the matrix signal wiring section 5, an individual signal wiring 22 made of a first conductive layer, the insulative layer 25 which covers the individual signal wiring, the semiconductor layer 26, the ohmic contact layer 27, and a common signal wiring 37 which crosses the individual signal wiring and is made of a second conductor layer are sequentially laminated onto the substrate 10. Reference numeral 38 denotes a contact hole to obtain an ohmic contact between the individual signal wiring 22 and the common signal wiring 37. Reference numeral 39 denotes a line to line shield wiring provided between the con, non signal wirings.

In the wiring section 6 of the gate lines to drive the TFTs, an individual gate wiring 40 made of the first conductor layer 24, the insulative layer 25 which covers the individual gate wiring, the semiconductor layer 26, the ohmic contact layer 27, and the common gate wiring 41 which crosses the individual gate wiring 40 and is made of the second conductor layer 28 are sequentially laminated onto the substrate 10. Reference numeral 42 denotes a contact hole to obtain an ohmic contact between the individual gate wiring 40 and the common gate wiring 41.

As mentioned above, in the photoelectric converting apparatus of the embodiment, since all of the photoelectric conversion element section, accumulation capacitor section, TFT setion, matrix signal wiring section, and gate drive wiring section have the laminate structure of the photoconductive semiconductor layer, insulative layer, conductor layer, and the like, those sections are simultaneously formed by the same process.

Further, a passivation layer 11 made of SiN or the like to mainly protect and stabilize the semiconductor layer surfaces of the photoelectric conversion element section 1 and TFT sections 3 and 4 and a friction resistance layer 8 made of a microsheet glass or the like to protect the photoelectric conversion elements and the like from the friction with the original P are formed on the second conductor layer 28.

A static electricity countermeasure layer 15 made of a translucent conductor layer is formed between the passivation layer 11 and the friction resistance layer 8.

The static electricity countermeasure layer 15 is arranged to prevent the static electricity which is generated by the friction between the original P and the friction resistance layer 8 from exerting an adverse influence on the photoelectric conversion elements and the like. A transparent conductive film of an oxide semiconductor such as ITO or the like is used as a material of the static electricity countermeasure layer 15 because it is necessary to transmit an illumination light L and the signal light L'.

In the embodiment, the friction resistance layer formed with the static electricity countermeasure layer is adhered onto the passivation layer 11 by an adhesive layer.

The embodiment uses a structure of the photoelectric converting apparatus of what is called a complete contact type in which the reflected light from an original is directly detected without using an equal magnification fiber lens array or the like. Thus, a system such as a facsimile apparatus or the like can be constructed in a fairly compact size and a degree of freedom in designing of the mechanism when a system is constructed increases.

The invention can be also used in an image reading apparatus of the contact reading type using an equal magnification fiber lens and the like.

Figure 1:
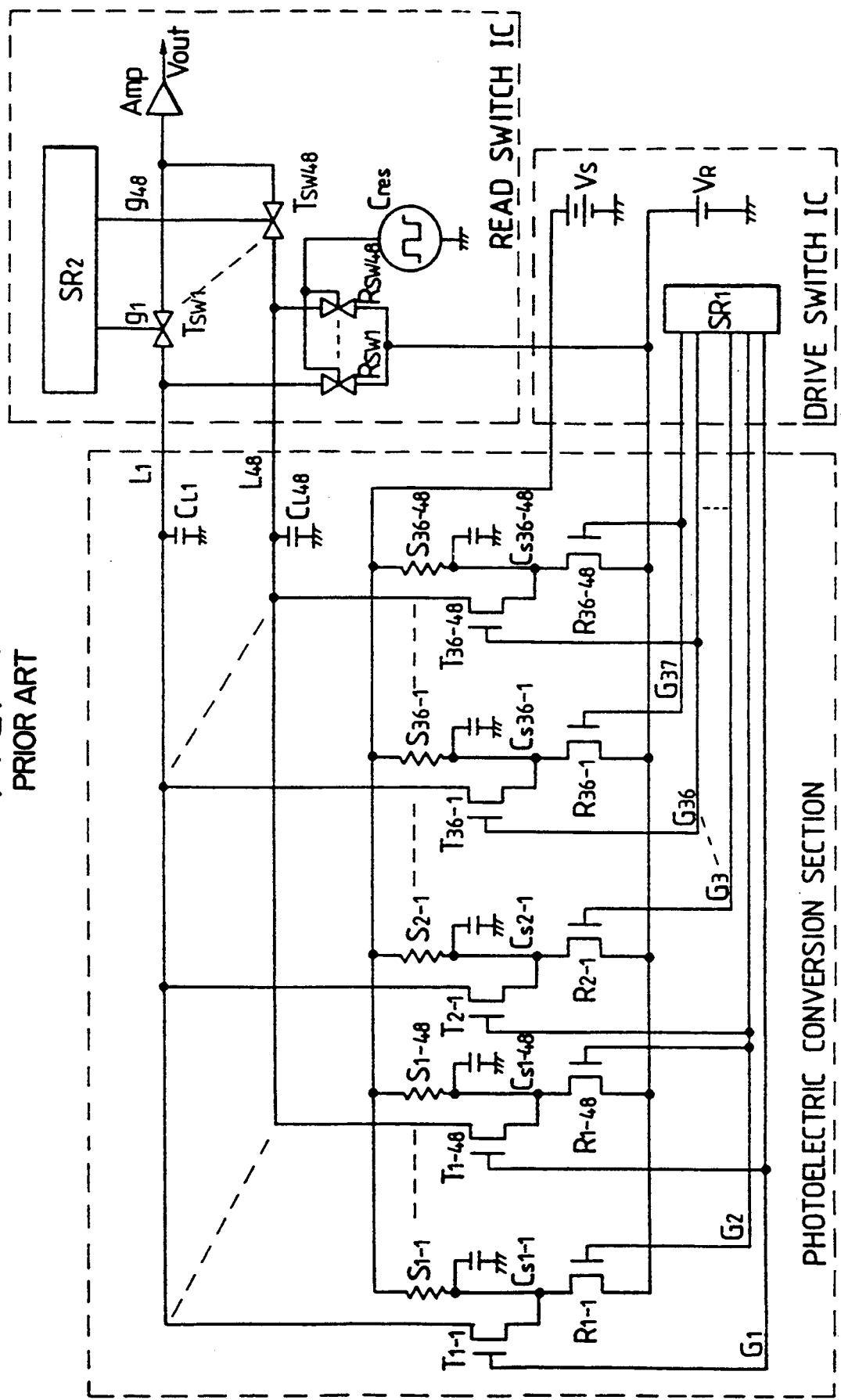
FIG. 1 is an equivalent circuit diagram of a conventional photoelectric converting device.
Figure 2:
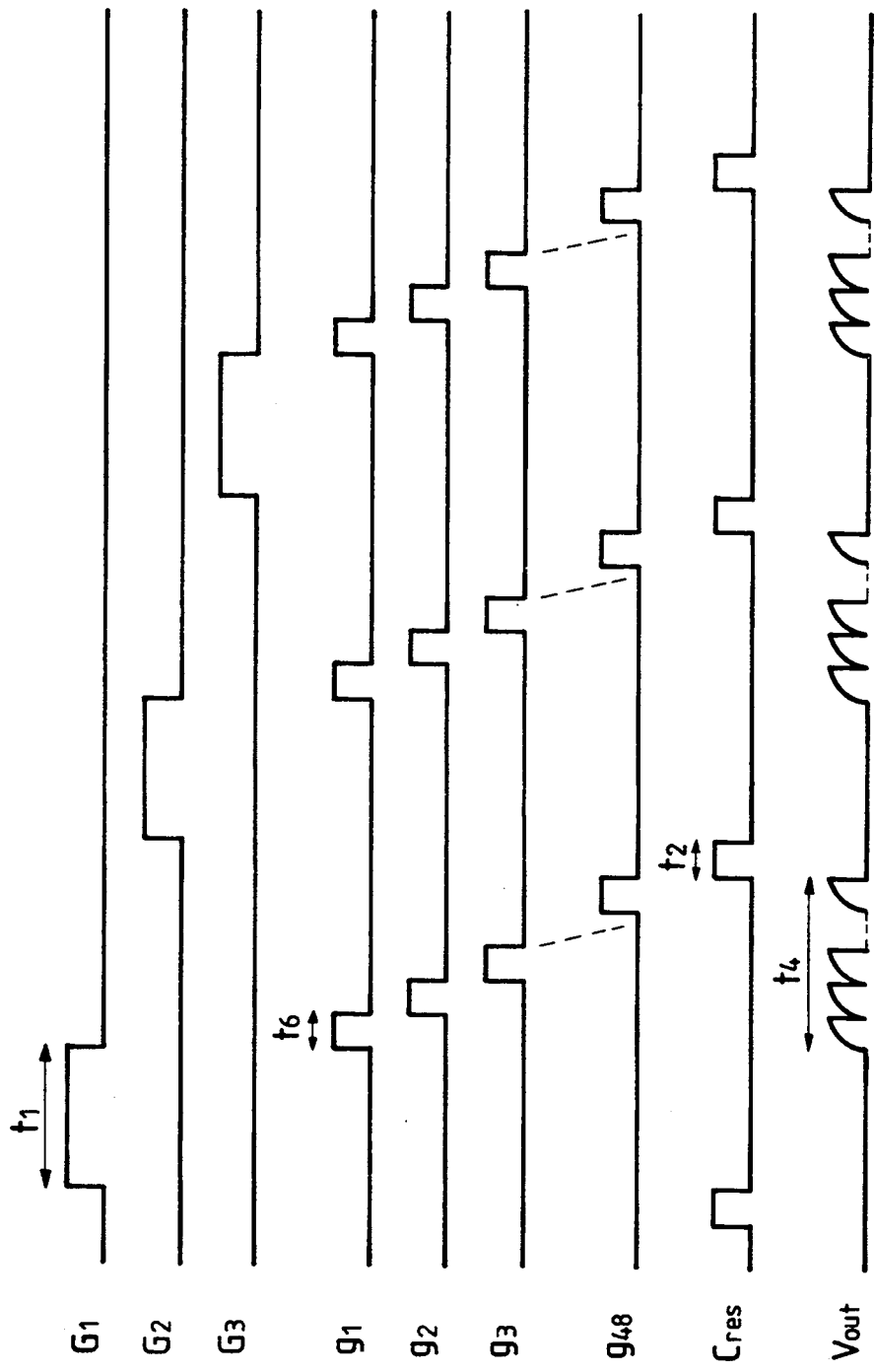
FIG. 2 is a timing chart for explaining the operation of the conventional photoelectric converting device.
Figure 6:
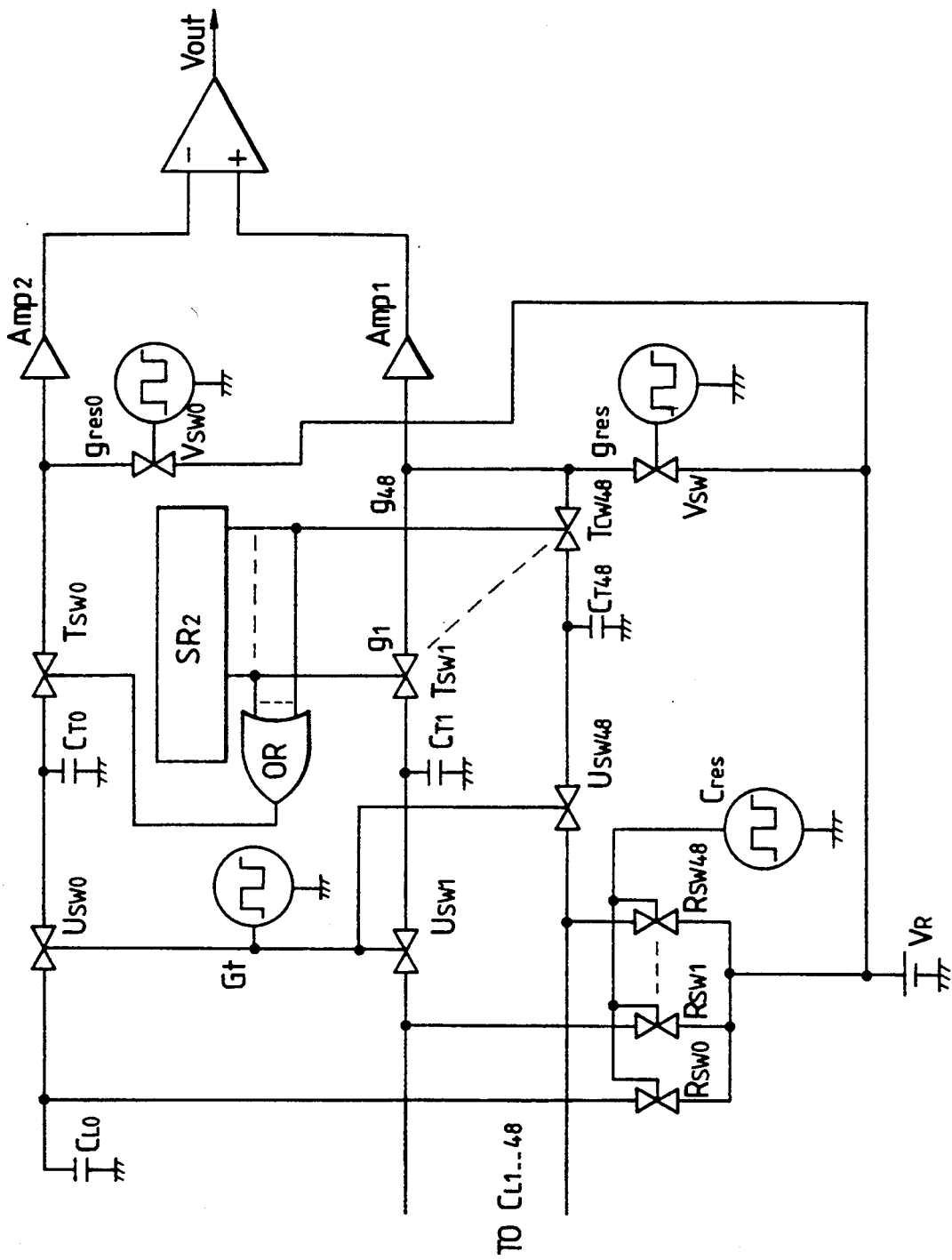
FIG. 6 is an equivalent circuit diagram of a parallel/serial conversion section of the second embodiment of the invention.

FIG. 6 shows a preferred second embodiment according to the invention and shows an equivalent circuit diagram of only a parallel/serial converting section 12 because a photoelectric converting section is similar to that in the first embodiment shown in FIG. 1.

It is a feature of the second embodiment that a dummy load capacitor $C_{L0}$, a transfer switch $U_{sw0}$ to transfer charges of the dummy load capacitor $C_{L0}$, a read capacitor $C_{T0}$, a read switch $T_{sw0}$, a reset switch $V_{sw0}$ to reset the read capacitor $C_{T0}$, and a reset switch $R_{sw0}$ to reset the dummy load capacitor $C_{L0}$ are added to the parallel/serial conversion section in the first embodiment.

Further, a timing control circuit OR to drive the above additional circuits and buffer amplifiers $Amp_1$ and $Amp_2$ and a differential amplifier for obtaining a differential output between an output of the dummy load capacitor and an ordinary signal output are added.

The reading operation of the second embodiment is executed as follows.

By applying the reset pulse $C_{res}$, the reset switch $R_{sw0}$ operates simultaneously with the reset switches $R_{sw1}$ to $R_{sw48}$ and the dummy load capacitor $C_{L0}$ is reset to the reset potential $V_R$. By applying the transfer pulse $G_t$, the transfer switch $U_{sw0}$ operates simultaneously with the transfer switches $U_{sw1}$ to $U_{sw48}$. The charges in the dummy load capacitor $C_{L0}$ are transferred to the read capacitor $C_{T0}$.

Then, by sequentially applying voltage pulses to the second gate drive lines $g_1$ to $g_{48}$ by the shift register $SR_2$, the read switches $T_{sw1}$ to $T_{sw48}$ are sequentially turned on, thereby generating a signal output from the buffer amplifier $Amp_1$. In parallel with the above operations, the read switch $T_{sw0}$ is switched at timings when the OR of the gate pulses of the second gate drive lines $g_1$ to $g_{48}$ is calculated and a potential of the read capacitor $C_{T0}$ is generated through the buffer amplifier $Amp_2$. On the other hand, the read capacitor $C_{T0}$ is reset to the reset potential $V_R$ by the reset switch $V_{sw0}$ at the same timing as the timing when the read capacitor $C_{T48}$ is reset.

By the above operations, a dummy signal which is generated from the buffer amplifier $Amp_2$ is ideally set to the reset potential $V_R$. However, actually, the switching noises of the switches are multiplexed. Similarly, in the signal which is generated from the buffer amplifier $Amp_1$, the switching noises of the switches are also multiplexed to the light information obtained by the photoelectric conversion section. The switching noises multiplexed to the dummy signal and the switching noises multiplexed to the light information can be substantially equalized by making the shapes and the like of the switches which are used coincident. Therefore, the switching noises can be cancelled by obtaining a difference between the dummy signal which is generated from the amplifier $Amp_2$ and the signal which is generated from the amplifier $Amp_1$.

As mentioned above, in the second embodiment, by adding the operation to read out the charges of the dummy load capacitor $C_{T0}$, the switching noises which can cause a problem when the signal is read out can be cancelled. Thus, the photoelectric converting apparatus of the present invention can be also applied to a system such as facsimile apparatus, image reader, or the like to execute image processes of a high quality.

Figure 7:
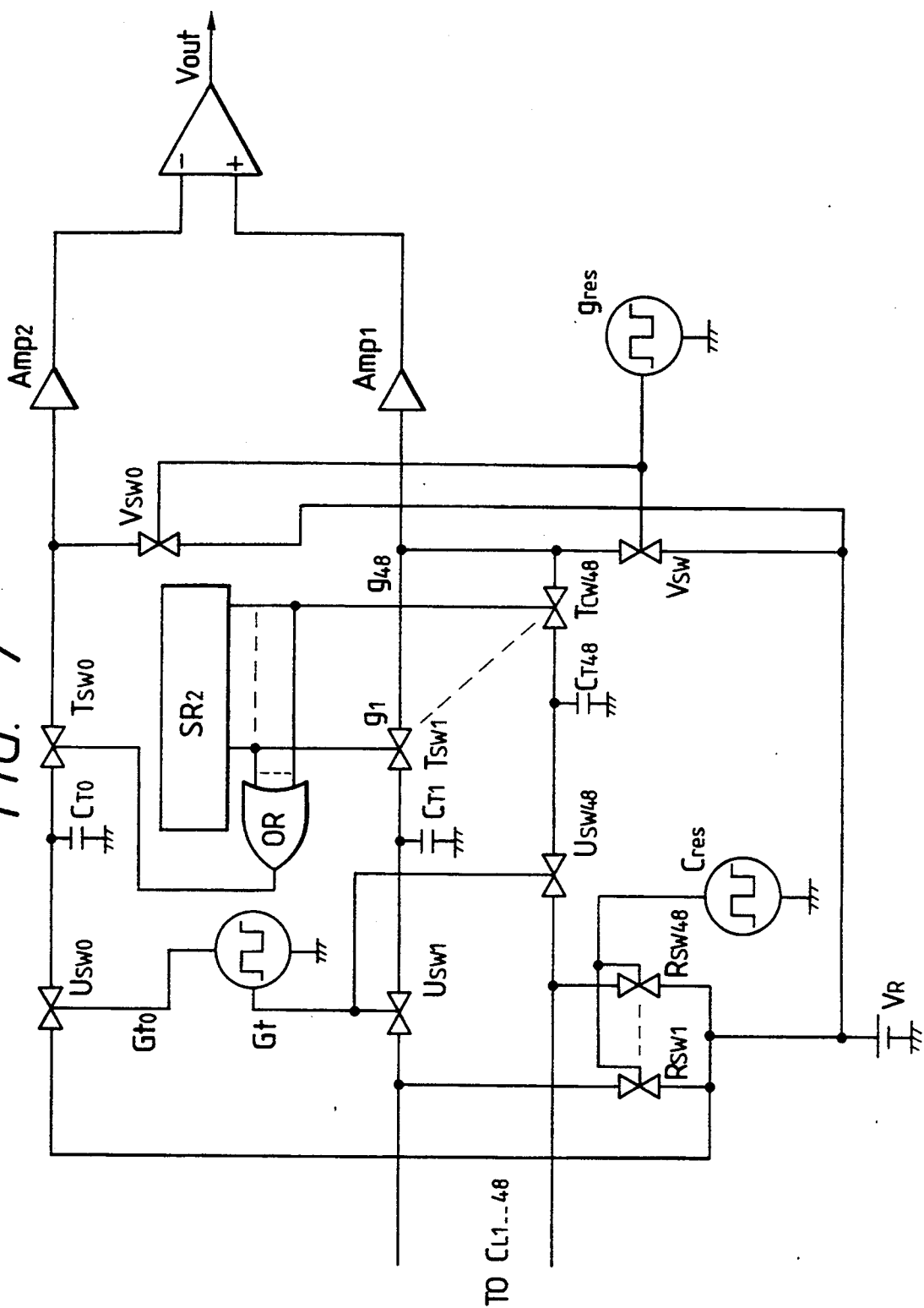
FIG. 7 is an equivalent circuit diagram of a parallel/serial conversion section in the third embodiment of the invention.

FIG. 7 shows a preferred third embodiment according to the invention and shows another example of a construction of the parallel/serial conversion section in which a dummy signal is read out and a difference between the dummy signal and the inherent signal output is obtained, thereby cancelling the switching noises in a manner similar to the second embodiment.

In the third embodiment, a power source for the reset potential $V_R$ is directly connected to the transfer switch $U_{sw0}$ in place of the dummy load capacitor $C_{L0}$ in the second embodiment. Since the transfer switch $U_{sw0}$ is driven by the gate pulse $G_t'$ at the timing synchronized with the reading timing of each bit, the potential of the read capacitor $C_{T0}$ is set to the reset potential $V_R$. The read switch $T_{sw0}$ is switched and the potential of the read capacitor $C_{T0}$ is read out to the buffer amplifier $Amp_2$ in a manner similar to the second embodiment. After that, the read capacitor $C_{T0}$ is reset by the reset switch $V_{sw0}$ at a timing of $g_{res}$.

Since the construction shown in FIG. 7 doesn't need the dummy load capacitor $C_{L0}$ of a large capacitance value within a range from 100 to 300 pF, the switching noises can be easily cancelled as compared with the method whereby the dummy load capacitor $C_{L0}$ is used as shown in the second embodiment.

Further, since the read capacitor $C_{L0}$ is reset at a timing of each bit, there are advantages such that a fluctuation of the potential of the read capacitor $C_{L0}$ due to a leakage current or the like can be reduced and an error in association with the noise cancellation can be extremely reduced.

By applying the photoelectric converting apparatus constructed as mentioned above, other various kinds of image processing apparatuses such as facsimile apparatus, image reader, copier, an electronic blackboad, and the like can be constructed.

Figure 8:
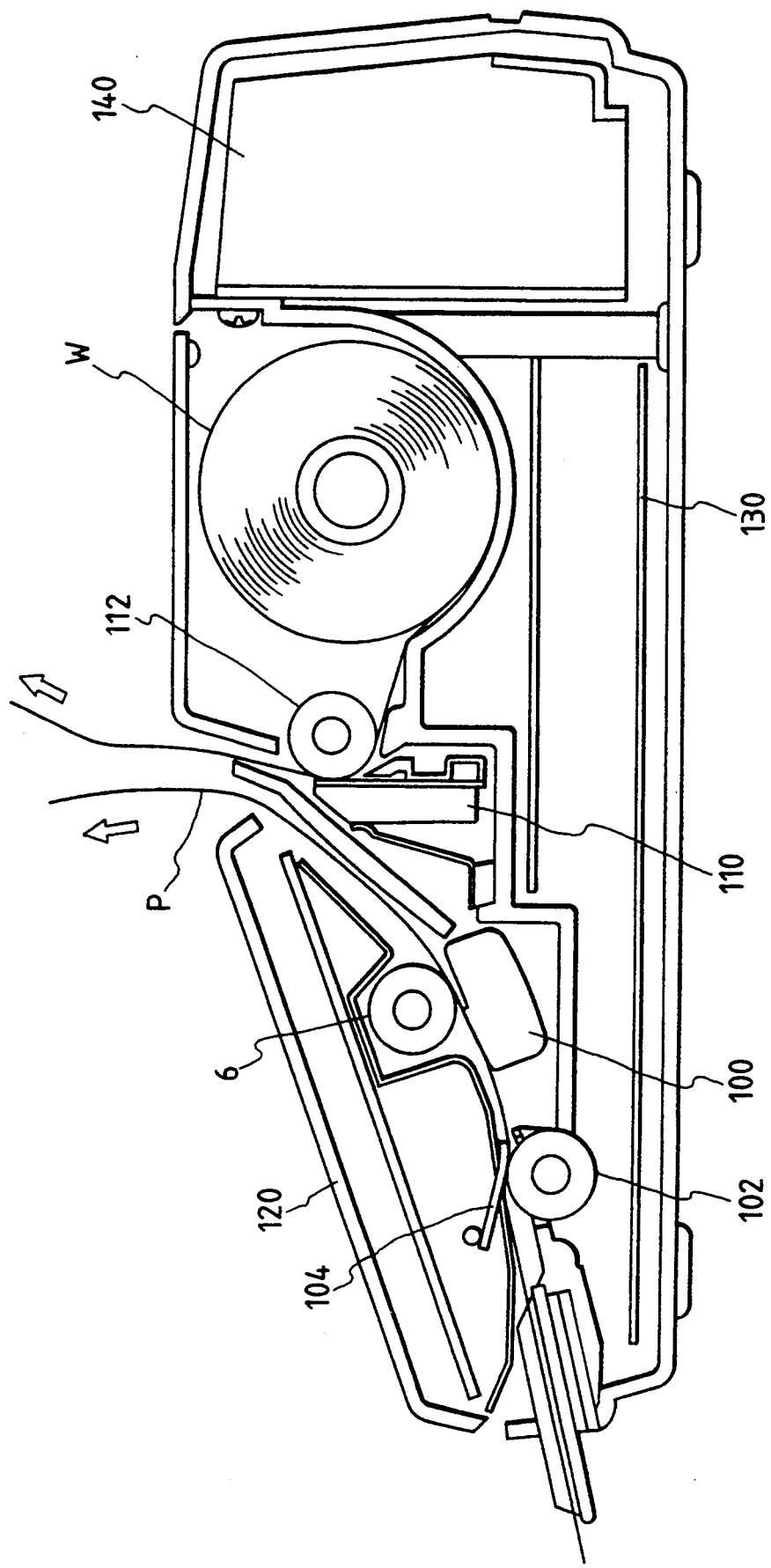
FIG. 8 is a schematic constructional diagram of a facsimile apparatus to which a photoelectric converting device of the invention is applied.

FIG. 8 shows a preferred example of a facsimile apparatus which is constructed by using the photoelectric converting apparatus of the invention. Reference numeral 102 denotes a feed roller to feed the original P toward the reading position; 104 indicates a separating member to certainly separate and feed the originals P one by one; and 106 a conveying roller which is arranged at the reading position for a photoelectric converting apparatus and restricts a surface of the original P to be read and conveys the original P.

In the example shown in the diagram, W denotes a recording medium having a form of a roll paper. Image information which was read by the photoelectric converting apparatus or image information which was transmitted from the outside is formed on the recording medium W. Reference numeral 110 denotes a recording head to form the image. Any one of various types of recording heads such as thermal head, ink jet recording head, and the like can be used as a recording head 110. As an ink jet recording head, for instance, there is preferably used a recording head of the type such that a film boiling phenomenon is caused in an ink by using a heat energy and a bubble is generated and the ink is emitted from an emission opening by the growth and contraction of the bubble. The recording head of either the serial type or the full-line type can be used. Reference numeral 112 denotes a platen roller for conveying the recording medium W toward the recording position by the recording head 110 and restricting the surface of the recording medium to be recorded.

Reference numeral 120 denotes an operation panel in which switches to execute operation inputs, a display section to display messages and an operating state of the apparatus, and the like are arranged.

Reference numeral 130 denotes a system control board. A control section to control each section, a processing circuit section of the image information, a transmitting and receiving section, and the like are provided on the board 130. Reference numeral 140 denotes a power source of the apparatus.

By using the photoelectric converting apparatus of the invention as an image input section of the system such as a facsimile apparatus or the like, the image processes on the system side can be executed by simple means. Thus, the costs of the whole system can be remarkably reduced.

As described above, according to the embodiment, the period of time when the signal between blocks is not generated in the signal output of the photoelectric converting apparatus which is matrix driven can be eliminated and the reading speed can be substantially made fast.

Further, since the period of time when the signal between blocks is not generated in the signal output is eliminated, the processes for temporarily storing the signal output of the photoelectric converting apparatus into the line memory before the signal output is image processed and for converting the intermittent signals into the continuous signal do not need to be executed on the side of the system such as a facsimile apparatus or the like or there is no need to non-continuously perform the image processes, so that there are advantages such that the costs of the whole system are not increased and the image quality is not deteriorated.

We claim:

1. A photoelectric converting device comprising:
    a photoelectric converting section in which a plurality of photoelectric conversion elements, transfer switching elements, matrix signal wirings, and gate drive wirings are arranged on a same substrate and which generates parallel signals;
    a drive switching section for applying drive signals to the gate drive wirings; and
    a read switching section for converting the parallel signals which are transferred from the matrix signal wirings into a serial signal, and for outputting the serial signal, said read switching section comprising (a) a plurality of transfer switches respectively connected to said matrix signal wirings and being activated together simultaneously, (b) a plurality of read capacitors, (c) a plurality of read switches for reading out carriers stored in said plurality of read capacitors, and (d) reading means for reading said read switches by sequentially switching said plurality of read switches such that a partial overlap occurs between (i) a first driving period of at least one of said transfer switching elements and (ii) a second driving period of at least one of said read switches.

2. An image processing apparatus using as an image input section,
    a photoelectric converting device according to claim 1.

3. An image processing apparatus according to claim 2, wherein
    said image processing apparatus comprises a facsimile machine.

4. An image processing apparatus according to claim 2, wherein
    said image processing apparatus comprises an image reader.

5. An image processing apparatus according to claim 2, wherein
    said image processing apparatus comprises a copier.

6. An image processing apparatus according to claim 2, wherein
    said image processing apparatus comprises an electronic blackboard.

7. An image processing apparatus according to claim 2, further comprising:
    a recording section for recording according to image information inputted by said image input section.

8. An image processing apparatus according to claim 7, wherein
    said recording section comprises an ink jet recording device.

9. An image processing apparatus according to claim 8, wherein
    said ink jet recording device emits an ink by means of a thermal energy.

10. A photoelectric converting device comprising:
    a photoelectric converting section including: (a) a plurality of photoelectric converting elements; (b) a plurality of blocks each having (b1) a storage capacitor provided correspondingly to one of said photoelectric converting elements, (b2) a switch element provided correspondingly to said one photoelectric converting element, and (b3) a reset switch; (c) a matrix wiring for outputting image information according to an order within said blocks; and (d) a plurality of load capacitors corresponding to said matrix wiring; and
    a reading circuit including: (e) a plurality of reading switch elements respectively connected to output lines of said matrix wiring; (f) a plurality of reading capacitors respectively connected to each output line of said matrix wiring and each having a capacitance smaller than a corresponding load capacitor; (g) a plurality of transfer switch elements for transferring carriers stored in said load capacitors to said reading capacitors; (h) a reset means for resetting said reading capacitors; (i) an additional reset means for resetting said load capacitors; and (j) means for sequentially driving said reading switch elements;
    wherein while one of said switch elements of one of said blocks is being driven, a reset switching element of a switch element of another block is being driven; and wherein said reading switch elements are turned on together.

11. An image processing apparatus using as an image input section,
    a photoelectric converting device according to claim 10.

12. An image processing apparatus according to claim 11, wherein said image processing apparatus comprises a facsimile machine.

13. An image processing apparatus according to claim 11, wherein
said image processing apparatus comprises an image reader.

14. An image processing apparatus according to claim 11, wherein
said image processing apparatus comprises a copier.

15. An image processing apparatus according to claim 11, wherein
said image processing apparatus comprises an electronic blackboard.

16. An image processing apparatus according to claim 11, further comprising:
a recording section for recording according to image information inputted by said image input section.

17. An image processing apparatus according to claim 16, wherein
said recording section comprises an ink jet recording device.

* * * * *